UNITED STATES PATENT OFFICE 2,315,556

PROCESS FOR PRODUCING HYDROXY-DIARYL SUBSTITUTED ETHANE

Frank J. Soday, Upper Darby, Pa., assignor to The United Gas Improvement Company, a corporation of Pennsylvania No Drawing. Application March 30, 1939, Serial No. 264,967

10 Claims. (Cl. 260—619)

This invention pertains generally to a process for the production of reaction products of a styrene type compound and a phenol, and pertains particularly to the production of styryl phenol.

The invention pertains more particularly to the production of compounds of this type capable of being further reacted with aldehydes generally to obtain resins of the phenol-aldehyde type which are soluble in the usual drying oils, such as linseed and tung oils.

There is thus made available oil soluble resins of the phenol-aldehyde type which are ideally suited for incorporation in liquid coating compositions, such as varnishes, lacquers, paints and the like, either alone or in combination with other resins.

The outstanding characteristics of the phenol-aldehyde type of resin are thus made available in the liquid coating composition field.

Since the more common phenol-aldehyde resins are not soluble in drying oils to a satisfactory degree, the use of such resins in the liquid coating composition field is limited.

However, after having acquired the quality of unusual oil solubility, the field of use of resins of the phenol-aldehyde type is greatly extended.

The reaction of styrene with phenol with the production of substituted phenols, has been described in the prior art (Konig, Ber. 24, 3889, 1891).

In the process described the reaction between styrene and phenol is brought about by the use of sulfuric acid or acetic acid as a catalyst.

Because of the extremely low yields obtained and the relatively large amount of catalyst employed which adds greatly to the cost, this process is of very limited industrial importance.

I have discovered that the styryl-phenol type compounds generally and styryl phenol particularly may be produced with high yields of excellent quality by reacting a hydrohalide of a styrene type compound with a phenol in the presence of a suitable catalyst.

By the term "styrene type compound" is meant styrene and substituted styrene.

For convenience the term "styryl hydrohalide" is used herein to mean a hydrohalide of a styrene type compound.

Examples of substituted styrenes are: (1) substituted styrenes in which the substituent group, or groups, are present in the side chain; (2) substituted styrenes in which the substituent group, or groups, are present in the nucleus; and (3) substituted styrenes in which a substituent group is present in both the nucleus and in the side chain.

Examples of substituted styrenes in which the substituent group, or groups, are present in the side chain may be represented as follows:

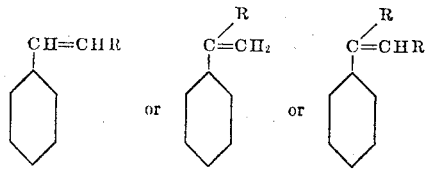

in which R represents alkyl or aryl or alkyl-aryl groups, or substituents thereof.

Examples of substituted styrenes in which the substituent group, or groups, are present in the nucleus may be represented as follows:

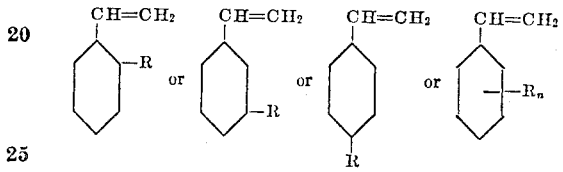

in which R represents alkyl or aryl or alkyl-aryl groups, or substituents thereof, and where $n$ represents the fact that one or more substituents may be present in the nucleus.

Examples of substituted styrenes in which a substituent group is present in both the nucleus and in the side chain may be represented as follows:

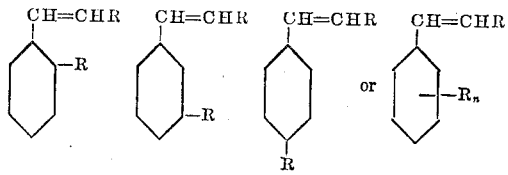

in which R represents alkyl or aryl or alkyl-aryl groups or substituents thereof, and where $n$ represents the fact that one or more substituents may be present in the nucleus.

The methyl styrenes, in which the methyl group is located in the nucleus:

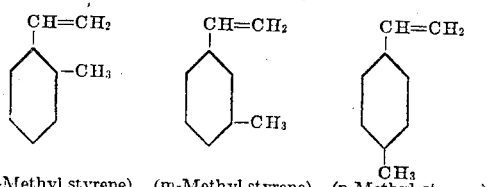

(o-Methyl styrene) (m-Methyl styrene) (p-Methyl styrene)

are particularly well adapted to the preparation of resins of this type.

These substituted styrenes may be obtained by the distillation of the light oil from oil gas, as well as from other sources.

Examples of phenols are phenol itself, other mono or poly-valent phenols, their substitution products such as the halogen, sulfo, alkyl, aryl, aralkyl, nitro, carboxyl, and azo-nuclear substitution products, and phenolic compounds in general. Within this class of compounds are included cresol, amino-phenols, nitro-phenols, chloro-phenols, thymol, naphthols, pyrocatechol, resorcinol, hydroquinone, pyrogallol, oxyhydroquinone, phloroglucinol, carvacrol, quinol, xylenol, guaiacol, orcinol, mesitol, pseudocumenol, toluhydroquinone, alpha naphthol, and beta naphthol, as well as mixtures containing one or more of these compounds.

Low temperature tar phenols and mixtures of phenolic compounds also may be used. These are contained, for example, in tar oils or alcohols, such as benzyl alcohol, or acids, such as acetic acid. The phenolic compounds may be used in the pure state, or as crude materials, or as technical mixtures.

Phenolic ethers also may be used in the process.

The foregoing compounds will be referred to herein as "phenolic compounds" or "phenols."

In carrying out the reaction between a styryl hydrohalide and a phenol, I prefer to employ as a catalyst one or more metal halides which term includes the boron halides and the complexes of all of the foregoing halides, and particularly the organic solvent complexes of said halides.

Examples of metal halides are aluminum chloride, zinc chloride, ferric chloride, boron trifluoride, boron trichloride, aluminum bromide, stannic chloride, titanium chloride, antimony bromide, and antimony chloride. These compounds are members of a group which for convenience may be designated as acid-acting metal halides. The reaction products resulting from the addition of these halides to diethyl ether may be regarded as examples of acid-acting metal halide-organic solvent complexes, though complexes are formed with many other organic solvents as well as other materials as is well known in the art.

Catalysts may be employed singly or in mixtures with each other and may or may not be deposited on carriers, such as solid contact materials or other substances such as barium sulfate, pumice, asbestos and silica.

The styryl hydrohalide to be used as starting material may be obtained from any suitable source known in the art, or may be prepared, for instance, by the addition of a selected hydrogen halide, such as hydrogen chloride to a styrene type compound.

In case the styryl hydrohalide is to be prepared, the styrene type compound to be hydrohalogenated may be either in concentrated form or in the form of a fraction or solution.

For example, styrene and methyl styrene may be obtained from light oil produced in the manufacture of gas, such as carburetted water gas or oil gas. The concentration of styrene or methyl styrene in a fraction is frequently relatively low, particularly in the case of forerunnings and afterrunnings, due to the difficulty of concentrating by distillation compounds which are capable of being polymerized by heat.

All of such fractions lend themselves to the production of styryl hydrohalides.

The styryl hydrohalides may be separated from such fractions, say by distillation, or may be employed without such separation.

As a general rule, both alpha and beta styryl hydrohalides are produced in this way, with the alpha compound predominating.

However, the reaction might be carried out in a manner such that the beta compound predominates.

If desired, the alpha and the beta compounds may be separated prior to their reaction with the phenol, or they may be reacted with the phenol without previous separation.

There are several possible reactions between a particular styryl hydrohalide and a phenol.

The reaction between alpha styrene chloride and phenol presumably takes place in the following manner.

(1)
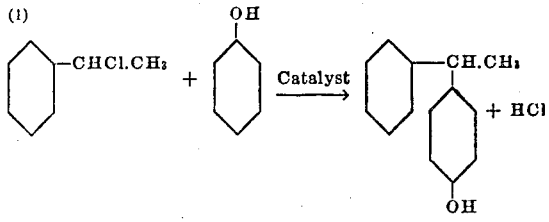

Alpha-styrene chloride   phenol      p-substituted alpha-styryl phenol

The product shown represents the para substitution product.

From theoretical considerations, the ortho compound also may be formed in the same reaction as follows:

(2)
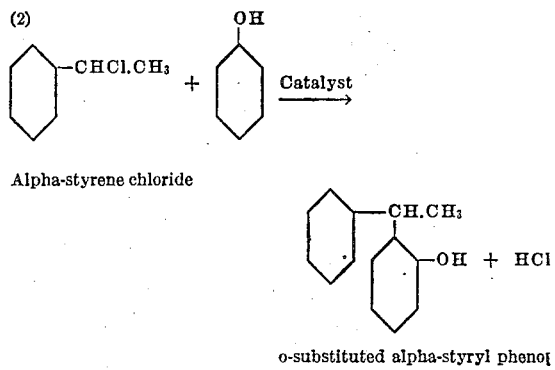

Alpha-styrene chloride

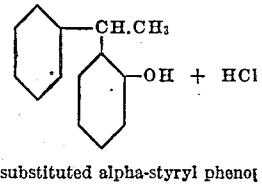

o-substituted alpha-styryl phenol

Presumably very little if any meta substituted compound is formed.

The beta-styrene chloride also may react with phenolic compounds in a similar manner.

(3)
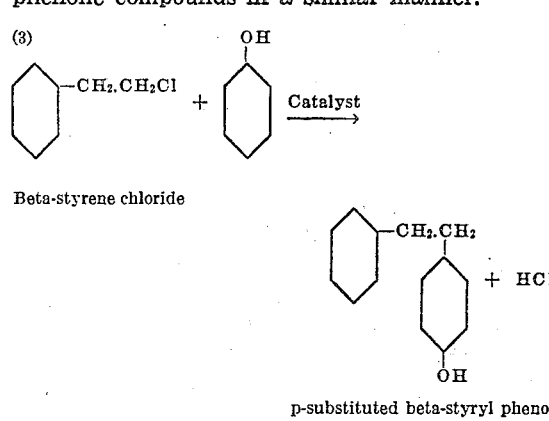

Beta-styrene chloride

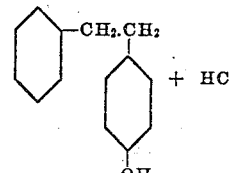

p-substituted beta-styryl pheno

The product shown in Reaction 3 is the para substituted form.

The ortho substituted form also may be formed in this reaction as shown in the following equation.

(4)

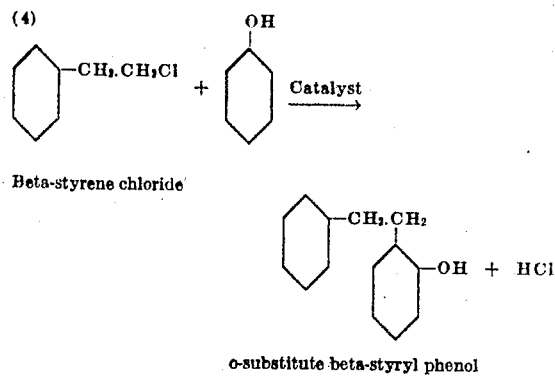

Beta-styrene chloride o-substitute beta-styryl phenol

Presumably very little, if any, meta substituted compound is formed.

As the invention is ordinarily carried out, the product of Reaction 1, namely p-substituted alpha-styryl phenol, or 1-(p-hydroxy phenyl)-1-phenyl-ethane, predominates.

The reaction between a styryl hydrohalide and a phenol may also result in the production of di- and poly-substituted derivatives, as shown, for example, by the following equation.

(5)

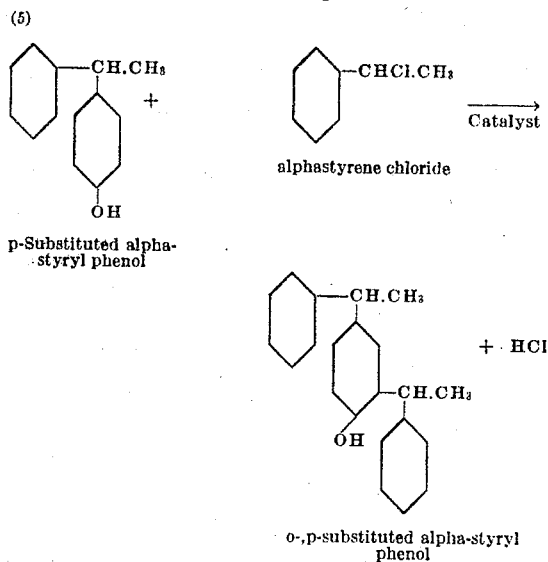

p-Substituted alpha-styryl phenol alphastyrene chloride o-,p-substituted alpha-styryl phenol In addition, styryl hydrohalides may react with phenolic compounds to give phenolic ethers, as shown in the following equation.

(6)

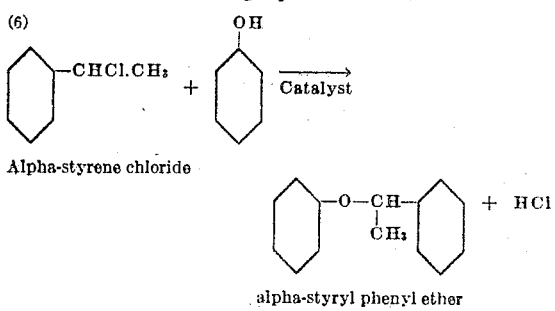

Alpha-styrene chloride alpha-styryl phenyl ether

Accordingly, a separation step, such as by distillation, usually follows the reaction if it is desired to employ the styryl phenol apart from the other materials.

Furthermore, while the mono substituted derivatives, namely styryl phenols, normally predominate in the reaction product over the di- and poly-substituted derivatives, it is possible to vary the proportion of one to the other by varying the proportion of starting materials.

For example, when phenol is in excess styryl phenol predominates in the reaction product, while when styryl hydrohalide is in excess the reaction product contains larger quantities of di- and poly-styryl phenols.

In carrying out my invention, the reactants may be combined in any desired manner whether or not in concentrated form, or in solution or admixture.

Contact between the materials may be effected in any manner known in the art. In this connection, reference is had to the very large number of different ways of contacting reactants in the prior art.

However, it is preferred when the chosen phenol is in excess to add the chosen styryl hydrohalide to a mixture of the phenol and the catalyst.

On the other hand, when the chosen styryl hydrohalide is in excess, it is preferred to add the chosen phenol to a mixture of the styryl hydrohalide and the catalyst.

The reaction may be carried out at almost any desired temperature which may vary during the reaction.

I find, for example, that excellent results are secured by conducting the first part of the reaction at moderate temperatures, for example, between 0° and 100° C., followed by higher temperatures, such as between 100° and 200° C.

Temperatures between 40 and 55° C. for the initial reaction followed by temperatures between 140° and 150° C. for the final reaction, are found to be particularly suitable.

In case the temperature is held uniform, temperatures between 10° and 180° C. are preferred.

While the reaction is customarily carried out at atmospheric pressure, it will be understood that sub-atmospheric and super-atmospheric pressures may be employed if desired.

The quantity of catalysts employed may also be varied over fairly wide limits. As an example, 0.1% to 10% by weight of catalyst to the combined weight of both reactants will be found suitable.

When using acid-acting metal halide catalysts or complexes thereof, 0.1% to 5% by weight of catalyst to the combined weight of both reactants is found particularly suitable.

In order to speed up the reaction and carry it further to completion, steps may be taken to remove hydrogen halide from the sphere of the reaction, such as by absorption, or by stirring or by passing an inert gas through the reaction mass.

The hydrogen halide thus displaced from the reaction mass may, of course, be recovered and reused in the hydrohalogenation of styrene type starting material.

However, considerable quantities of hydrogen halide escape from the reaction mass without external aid.

The following example will further illustrate the process.

EXAMPLE 1

A 400 gram portion of a 39% styrene fraction (containing 156 grams, or 1½ mols of styrene), obtained by the fractionation of light oil obtained from oil gas was placed in a one liter three-neck flask equipped with a stirring device. The flask and its contents were cooled to a temperature of 0° C. and a moderate stream of dry hydrogen chloride introduced into the flask. The reaction was continued for a period of 24 hours, during which time 2.0 mols of hydrogen chloride were absorbed by the styrene fraction.

The excess hydrogen chloride was removed from the styrene fraction by distilling under reduced pressure. The residual material was washed with water, dried, and distilled in a Vigreux column to remove the unchanged hydrocarbons present. The residue then was fractionated.

One hundred seventy grams (81% yield) of a-phenyl ethyl chloride was obtained with the following physical properties: B. P.=82–83° C. @ 2 mm. density $d\ 20/4=1.0632$ refractive index $n\ 20/D=1.5274$, refractive intercept $=0.99580$.

A 99.8 gram portion of this a-phenyl ethyl chloride was slowly added with good agitation to a mixture of 66.7 grams of phenol, 3.0 grams of aluminum chloride, and 200 grams of freshly dried n-heptane. The reaction mixture was agitated for a period of 6 hours at room temperature, followed by agitation for an additional period of one hour at a temperature of 50° C. During the first hour of the reaction, considerable quantities of hydrogen chloride were given off by the reaction mixture.

The catalyst component of the mixture was neutralized was a 20% aqueous solution of sodium carbonate and washed with several volumes of water. The product then was distilled under reduced pressure (5.5 mm.) in a Claissen flask. Sixty-six grams of styryl phenol was obtained, as well as 46 grams of a higher boiling fraction (212–250° C. @ 5.5 mm.) consisting mainly of distyryl phenol.

If desired, the styryl hydrohalide may be generated in situ.

For example, the styryl hydrohalide may be prepared from the hydrogen halide liberated during the course of the reaction with the phenol. In this instance, a small amount of styryl hydrohalide may be added to the reaction mass to start the reaction followed by the addition of the remainder in the form of the corresponding styrene type compound.

On the other hand, hydrogen halide may be supplied by bubbling it through the reaction mass.

This is illustrated in Examples 2 and 3 as follows:

EXAMPLE 2

9.68 grams of a-phenyl ethyl chloride, 1.61 grams of aluminum chloride and 321.5 grams of phenol were mixed in a one-liter three-neck flask at a temperature of 50° C. A 148.5 gram portion of a styrene fraction obtained by the distillation of light oil from oil gas (and containing 97.3 grams of monomeric styrene) was slowly added to the mixture during a period of one hour. The mixture was continually agitated during this time and the temperature was maintained within 40–55° C. The temperature then was raised to 140–150° C. during a period of 20 minutes, and maintained at this point for an additional period for 2 hours.

The catalyst component of the solution then was neutralized with a 20% solution of sodium carbonate containing 3.9 grams of $Na_2CO_3$. The water layer was separated and the residue distilled in a modified Claissen flask under reduced pressure.

146 grams of styryl phenol (73% yield), with a boiling range of 155–200° C. @ 4 mm. were obtained. 7.4 grams of the higher boiling (200–203° C. @ 4 mm.) distyryl phenol also was obtained.

The styryl phenol was obtained as a colorless, viscous liquid which slowly crystallized on standing, forming colorless crystals.

EXAMPLE 3

A 2.0 gram portion of a styrene fraction obtained by the distillation of light oil from oil gas, and containing 1.3 grams of monomeric styrene, 1.56 grams of anhydrous aluminum chloride, and 312.8 grams of phenol were placed in a three-neck flask. A slow stream of hydrogen chloride was bubbled into the mixture during a period of one minute at a temperature of 40–50° C. A 157 gram portion of the styrene fraction previously described, containing 102.9 grams of monomeric styrene, was slowly added to this mixture during the course of one hour with good agitation at a temperature of 40–55° C. The temperature then was raised to 140–150° C. during the course of 20 minutes, and the contents of the flask maintained at this temperature during an additional period of 2 hours.

The reaction mixture was treated with 3.7 grams of sodium carbonate in the form of a 20% aqueous solution, the water layer separated, and the residue distilled in vacuo.

164 grams of styryl phenol (82.4% yield), in the boiling range of 150–201° C. @ 4 mm. were obtained. In addition, 15.0 grams of the higher boiling distyryl phenol also were obtained.

The styryl phenol fractions slowly crystallized, yielding snow-white crystals of pure styryl phenol.

A further modification of this invention resides in the preparation of a styryl phenol by the reaction of a styrene type compound and a phenol in the presence of a metal halide and moisture, of which a trace is frequently sufficient. It is found that the minute quantity of hydrogen halide liberated due to the presence of even a trace of moisture is sufficient to initiate the reaction.

This is illustrated in the following example:

EXAMPLE 4

A 159 gram portion of a very slightly moist styrene fraction obtained by the distillation of light oil from oil gas, and containing 104.2 grams of monomeric styrene, was slowly added with good agitation to a mixture of 312.3 grams of phenol and 1.56 grams of aluminum chloride during a period of one hour at a temperature of 40–55° C. The temperature was raised to 140–150° C. during a period of 20 minutes, and the contents of the flask were maintained at this temperature during an additional period of 2 hours.

The catalyst then was neutralized by the addition of 3.7 grams of sodium carbonate in the form of a 20% solution. The residue was distilled in a modified Claissen flask under reduced pressure.

A 151.3 gram portion (76.3% yield) of styryl phenol was obtained (B. P.=150–200° C. @ 4 mm.). In addition, 20.2 grams of a higher boiling fraction, consisting mainly of distyryl phenol, also was obtained.

The styryl phenol was obtained as a colorless, viscous oil, which was slowly transformed into colorless crystals on standing.

The boiling range of the styryl phenol listed in the foregoing examples does not represent the true boiling range of the material due to excessive superheating during the distillation process. A redistillation of the styrl phenol obtained, using a short fractionating column, resulted in the isolation of approximately 75% of the material in the boiling range of 145–155° C. at 2–5 mm. pressure, absolute.

The following example illustrates the process as applied to the preparation of substituted phenolic compounds from a homologue of styrene.

EXAMPLE 5

A mixture of 2.0 grams of a 74.4% p-methyl styrene fraction obtained from light oil produced in the manufacture of oil gas (containing 1.5 grams of p-methyl styrene) and 1.7 grams of anhydrous aluminum chloride was added to 333.1 grams of phenol in a round bottom flask. Gaseous hydrogen chloride was bubbled into this mixture for a period of one minute, after which the addition of hydrogen chloride was discontinued. A 147.7 gram portion of the same p-methyl styrene fraction, containing 109.9 grams of p-methyl styrene, was added to this mixture during a period of one hour at a temperature of approximately 50° C. The reaction was exothermic, requiring the application of cooling water from time to time in order to maintain the temperature at the desired level. After the addition of the p-methyl styrene fraction had been completed, the mixture was heated for an additional period of 2 hours at a temperature of 140–150° C. It was then cooled to room temperature and the catalyst component neutralized by the addition of 4 grams of sodium carbonate in the form of a 20% aqueous solution. After the removal of the aqueous layer, the residue was distilled under reduced pressure.

A total of 186.2 grams of p-methyl styrene phenol, equivalent to a yield of 93%, was obtained. The material had a boiling range of 158–215° C. @ 4.5 mm. pressure, absolute, the major portion boiling between 173–186° C. In addition, 13.6 grams of higher boiling material, presumably di-p-methyl styrene phenol, also was obtained.

The mechanism proposed for this reaction is of the chain type. Styryl hydrohalide reacts with a phenol to give substituted phenolic compounds with the liberation of hydrogen halide, which in turn reacts with more styrene type compound to produce further styryl hydrohalide, thus perpetuating the reaction.

A further extension is the addition of a small amount of some other hydrocarbon halide to the reaction mass with or without the presence of moisture to initiate the reaction by the liberation of a small amount of hydrogen halide, which in turn reacts with the styrene type compound present to form styryl hydrohalide, the formation of which is then perpetuated.

The degree of contamination resulting from starting the reaction with a hydrocarbon halide becomes less significant, the larger the quantities of styryl hydrohalide and phenol reacted.

On the other hand, larger quantities of alkyl or aryl halide may be employed to initiate the reaction, in which case the product eventually obtained will comprise a mixture of styryl substituted phenols and phenolic ethers, as well as substituted phenols and phenolic ethers derived from the aryl or alkyl halide.

The product thus obtained may be, in turn, reacted as such with an aldehyde to form a resin, or its components may be previously separated such as by fractional distillation at reduced pressures, and then one or more separately reacted with an aldehyde.

The use of a substantial quantity of a hydrocarbon halide permits the preparation of substituted phenols with a wide variety of different properties, since the hydrocarbon halide may be selected from a wide variety of different compounds both alkyl and aryl.

Furthermore, the properties may be varied considerably by varying the relative proportions of hydrocarbon halide and styryl hydrohalide.

Styryl phenol may be isolated from the reaction mass if desired, by any means known in the art. For instance, it may be isolated by washing out any excess phenol followed by fractional distillation under reduced pressure.

Styryl phenol also may be isolated directly by fractional distillation under reduced pressure.

When using fractional distillation fairly low pressures are recommended, such as pressures of the order of from 1 to 20 mm. absolute.

However, the reaction product may be reacted with an aldehyde without previous separation into component parts.

For example, it may be reacted with formaldehyde or formaldehyde yielding substances, such as hexamethylenetetramine, either with or without the addition of a further coupling agent, for example, a small amount of oxalic acid.

Usually, it will be found that a further coupling agent is not required since the residual hydrogen halide present in the reaction product serves as a very effective coupling agent.

The production of phenol-formaldehyde type resins is illustrated by the following examples.

EXAMPLE 6

A 0.5 mol (99 grams) portion of styryl phenol was reacted with 0.8 mol of aqueous 38% formaldehyde with good stirring for a period of 20 hours, using a small amount of oxialic acid as a catalyst. The condensation product then was steam distilled.

The resinous product was obtained in a yield of 70%. It had the following physical properties:

Color—Gardner Holt _____ 8.0
Melting point, A. S. T. M. ball and ring method _____°C____ 83.5

The resin was completely compatible with both linseed oil and tung oil as shown in the following example.

EXAMPLE 7

A standard 15 gallon varnish was prepared from this resin in the following manner.

*Formula*

| | Parts |
|---|---|
| Resin | 12.2 |
| China-wood oil | 14.0 |
| Solvent naphtha V. M. & P. | 26.2 |
| Drier (cobalt, manganese, and lead drier) | 1.0 |

The mixture of resin and China-wood oil was heated in a copper beaker to a temperature of 400° F. during a period of 20 minutes. The mixture then was heated to a temperature of 560° F. during a period of 10 minutes, and held at this temperature for an additional period of 3 minutes. It was allowed to cool to 535° F., held at this temperature for a period of 6 minutes, chilled to 400° F. (by partially immersing the beaker in water) and reduced by the addition of the solvent naphtha. The drier was stirred into the varnish when it reached room temperature.

The product was a clear, light colored varnish with excellent coating properties. It may be used to coat metals, wood, and other surfaces.

EXAMPLE 8

A 20 gram portion of para-methyl styrene phenol was reacted with 14.0 grams of a 40% aqueous solution of formaldehyde with good stirring for a period of 20 hours at a temperature of 100° C., using 0.2 gram of oxalic acid as a catalyst. The condensation product was then steam distilled, resulting in the isolation of 12.2 grams of a light colored resin.

The resin was completely compatible with the usual drying oils, as shown by the following example.

EXAMPLE 9

A standard 15 gallon varnish was prepared from this resin in the following manner.

Formula

| | Parts |
|---|---|
| Resin | 12.2 |
| China-wood oil | 14.0 |
| Solvent naphtha V. M. & P. | 34.5 |
| Drier (comprising cobalt, manganese, and lead naphthenates) | 1.0 |

The mixture of resin and China-wood oil was heated in a copper beaker to a temperature of 400° F. during a period of 10 minutes. The mixture then was heated to a temperature of 560° F. during a period of 5 minutes, and held at this temperature for an additional period of 2 minutes. It was allowed to cool to 535° F., held at this temperature for a period of 3 minutes, chilled to 400° F. (by partially immersing the beaker in water) and reduced by the addition of the solvent naphtha. The drier was stirred into the varnish when it reached room temperature.

The product was a clear, light colored varnish with excellent coating properties. It may be used to coat metals, as well as wood and other surfaces.

The substituted phenolic compounds made in accordance with my invention, may be reacted with any of the aldehydes commonly used for the preparation of phenol-aldehyde type resins.

In the case of formaldehyde, gaseous formaldehyde, aqueous formaldehyde solutions of different concentrations, polymerization products of formaldehyde, such as trioxymethylene, polyoxymethylenes, or paraformaldehyde, or formaldehyde yielding substances, such as hexamethylene tetramine may be employed.

The resin forming reaction, if desired, may take place in the presence of inert substances, such as plasticizers, fillers, pigments, coloring bodies, and the like.

Furthermore, the resin-forming reaction may be carried out in the presence of fats; oils such as drying oils, linseed oil, tung oil, castor oil, oiticica oil; waxes, such as montan wax; natural resins, such as colophony, kauri, copal, dammar; and synthetic resins, such as coumarone resin, urea-formaldehyde resin and the like.

The resinification reaction may be carried out in two or more stages, if desired.

Thus, a product may be produced by a preliminary condensation reaction and the melting point raised by subsequent heating.

The products resulting from the resinification reaction may vary considerably in their properties, such as from resinous viscous liquids to solid substances of different degrees of hardness, depending upon the choice of the reactants used for resinification and resinification conditions such as temperature and reaction time.

As pointed out above, the resins thus produced are ideally suited for incorporation in liquid coating compositions, such as varnishes, lacquers, paints, and the like, in view of their unusual high solubility in the customary drying oils, such as linseed oil and tung oil.

My process is subject to considerable variation. For instance, the production of styryl phenol and the resinification reaction may take place simultaneously, in which case the aldehyde might be added to the reaction mass simultaneously with the other reactants or the aldehyde might be added at any other time or manner, such as at any stage after the reaction for the production of styryl phenol has commenced.

This reaction usually does not require a coupling agent, however, a coupling agent may be added, if desired.

Generally speaking, coupling agents suitable for use herein may be of any type and either acid, neutral or alkaline in character.

From the foregoing description and examples, it will be seen that the hydrohalide of a styrene type compound (which is also referred to for convenience as a styryl hydrohalide) may be previously formed or generated in situ. Therefore, for the purposes of the claims, the term "hydrohalide of a styrene type compound" unless otherwise modified, is intended to mean a hydrohalide of this character whether previously formed, or formed in situ.

It is to be understood that the above particular description is by way of illustration and that, broadly speaking, changes, omissions, additions, substituents and/or modifications might be made within the scope of the claims without departing from the spirit of the invention which is intended to be limited only as required by the prior art.

I claim:

1. A process for the production of hydroxy-diphenyl ethane comprising contacting a light oil styrene fraction with hydrogen chloride to form phenyl chlorethane, reacting said phenyl; chlorethane with phenol in the presence of aluminum chloride, and separating hydroxy-diphenyl ethane from the reaction mixture.

2. A process for the production of hydroxy-diphenyl ethane comprising admixing phenol with a relatively small amount of phenyl chlorethane and a relatively small amount of aluminum chloride, adding a light oil styrene fraction to said mixture with agitation while maintaining the temperature at about 40°–55° C. thereafter raising the temperature to about 140°–150° C. and continuing the reaction for a desired period, and separating hydroxy-diphenyl ethane from the reaction mixture.

3. A process for the production of hydroxy-diphenyl ethane comprising admixing phenol with a relatively small amount of a light oil styrene fraction and a relatively small amount of aluminum chloride, contacting the resulting mixture with a relatively small amount of hydrogen chloride at a temperature of about 40°–50° C., adding another but substantial portion of a light oil styrene fraction to said mixture with agitation while maintaining a temperature of about 40°–55° C. thereafter raising the temperature to about 140°–150° C. and continuing the reaction for a desired period, and separating hydroxy-diphenyl ethane from the reaction mixture.

4. A process for the production of hydroxy-diphenyl ethane comprising admixing phenol with a light oil styrene fraction containing a relatively small amount of moisture in the presence of a relatively small amount of aluminum chloride while maintaining the temperature at about 40°–55° C., thereafter raising the temperature to about 140°–150° C. and continuing the reaction for a desired period, and separating hydroxyl-diphenyl ethane from the reaction mixture.

5. A process for the production of hydroxy-phenyl p-tolylethane comprising admixing phenol with a relatively small amount of a light oil p-methyl styrene fraction and a relatively small amount of aluminum chloride, contacting the resulting mixture with a relatively small amount of hydrogen chloride, adding another but substantial portion of a light oil p-methyl styrene fraction to said mixture, thereafter heating to about 140°–150° C. and continuing the reaction for a desired period, and separating hydroxy-phenyl p-tolyethane from the reaction mixture.

6. A process for producing hydroxy-diaryl substituted ethane from aryl substituted ethylene comprising reacting said aryl substituted ethylene with a hydrohalide to produce aryl substituted haloethane, and reacting said aryl substituted haloethane thus produced with a phenol in the presence of an acid acting metal halide catalyst to produce said hydroxy-diaryl substituted ethane.

7. A process for producing hydroxy-diphenyl ethane from styrene comprising reacting styrene with a hydrohalide to produce phenyl haloethane, and reacting the phenyl haloethane thus produced with phenol in the presence of an acid acting metal halide catalyst to produce said hydroxy-diphenyl ethane.

8. A process for producing hydroxy-phenyl tolyethane from methyl styrene comprising reacting methyl styrene with a hydrohalide to produce tolyhaloethane and reacting the toly-haloethane thus produced with phenol in the presence of an acid acting metal halide catalyst to produce said hydroxy-phenyl tolyethane.

9. A process for the production of hydroxy-diphenyl ethane from styrene which comprises reacting styrene with a hydrohalide to produce phenyl haloethane and reacting the phenyl haloethane thus produced with phenol in the presence of aluminum chloride to produce said hydroxy-diphenyl ethane.

10. A process for producing hydroxy-diphenyl ethane from styrene which comprises reacting styrene with hydrogen chloride to produce phenyl chloroethane and reacting the phenyl chloroethane thus produced with phenol in the presense of aluminum chloride to produce said hydroxy-diphenyl ethane.

FRANK J. SODAY.